US008280819B2

(12) United States Patent
Davis et al.

(10) Patent No.: US 8,280,819 B2
(45) Date of Patent: Oct. 2, 2012

(54) METHOD AND APPARATUS FOR SECURELY DISPLAYING AND COMMUNICATING TRUSTED AND UNTRUSTED INTERNET CONTENT

(75) Inventors: Jeremy Alan Davis, San Jose, CA (US);
Evan Gilbert, San Francisco, CA (US);
Randall B. Spickler, Morgan Hill, CA (US)

(73) Assignee: eBay Inc., San Jose, CA (US)

( * ) Notice: Subject to any disclaimer, the term of this patent is extended or adjusted under 35 U.S.C. 154(b) by 1201 days.

(21) Appl. No.: 10/888,784

(22) Filed: Jul. 9, 2004

(65) Prior Publication Data

US 2006/0010134 A1      Jan. 12, 2006

(51) Int. Cl.
*G06Q 20/00* (2006.01)
(52) U.S. Cl. ............................................. 705/67; 705/64
(58) Field of Classification Search ................ 705/50–79
See application file for complete search history.

(56) References Cited

U.S. PATENT DOCUMENTS

| | | | |
|---|---|---|---|
| 6,567,918 B1* | 5/2003 | Flynn et al. ........................ | 726/7 |
| 6,732,161 B1 | 5/2004 | Hess et al. | |
| 2003/0135504 A1* | 7/2003 | Elvanoglu et al. ............ | 707/100 |
| 2004/0015565 A1 | 1/2004 | Bednar et al. | |
| 2005/0131992 A1* | 6/2005 | Goldstein et al. ............. | 709/202 |
| 2005/0187895 A1* | 8/2005 | Paya et al. .......................... | 707/1 |

OTHER PUBLICATIONS

Buyens, Jim, Step by Step Web Database Development, 2000, Microsoft Press, ISBN 0-7356-0966-7, p. 128.*
"Cross-Frame Scripting Security in Microsoft Internet Explorer" Microsoft Support WebCast, Teodora Stanev; Apr. 3, 2001; retrieved from Internet, pp. 1-10 and associated presentation slides by Teodora Stanev, Support Engineer, Internet Client Development, Microsoft Corporation—pp. 1-37.
"Redmond's Gray Skies of Summer" by Jay Allen, Mark Davis, Heidi Houisten and Tosh Meston, Microsoft Corporation, Jul. 2, 2002; excerpts retrieved from Internet, 3 pages.
"About Cross-Frame Scripting and Security" Microsoft Corporation; retrieved from Internet on Jun. 10, 2004; 1 page.
"FRAME Element/frame Object" Microsoft Corporation; retrieved from Internet on Jun. 29, 2004; 3 pages.
"Using IFRAME Elements", Microsoft Corporation; retrieved from Internet on Jun. 10, 2004; 2 pages.
"IFRAME Element/iframe Object", Microsoft Corporation; retrieved from Internet on Jun. 10, 2004; 3 pages.
"K-021: Malicious HTML Tags Vulnerability" Feb. 2, 2000/revised Feb. 3, 2000; US Department of Energy, Computer Incident Advisory Capability - Information Bulletin, pp. 1-8.

* cited by examiner

*Primary Examiner* — Evens J Augustin
*Assistant Examiner* — Thomas West
(74) *Attorney, Agent, or Firm* — Schwegman Lundberg & Woessner, P.A.

(57) ABSTRACT

A method and apparatus for securely displaying and communicating trusted and untrusted internet content via a web browser is described. In a preferred embodiment, the invention is an electronic marketplace system in which auction-related content is displayed in one window of a customer's web browser while item-related content is displayed in a second window of the customer's web browser, such that the auction-related content and the item-related content are substantially prevented from substantially interacting. The invention further provides a method and apparatus for communicating predetermined information between multiple documents opened in multiple web browser windows, where the documents are served from multiple domains.

9 Claims, 8 Drawing Sheets

← Back to item description

Fig. 1
(Prior Art)

Sample Item for Sale    ⟵ 100        122 ⟶    Item number: 5505543459

Starting bid:   US $0.25    ⟵ 102    124 ⟶   Seller information

Time left:      1 days 21 hours   ⟵ 104                    ( 114 ☆ )
                7-day listing
                Ends Jul-08-04                Feedback Score: 114
                11:40:36 PDT                 Positive Feedback: 98.3%
                Add to Calendar              Member since            in
                                             United States Start time:     Jul-01-04 11:40:36   ⟵ 106   Read feedback comments
                PDT                          Ask seller a question History:        0 bids              ⟵ 108   View seller's other items Safe Buying Tips
Item location:  USA                 ⟵ 110
                United States Ships to:       Local pickup only    ⟵ 112
                (no shipping)

↓ Shipping and payment details

Description (revised)

\* \* \*
Sample HTML item description          } 114
\* \* \*

Shipping and payment details                        ⟵ 116
  Shipping and handling:   Check item description and payment
                           instructions or contact seller for details.

Will arrange for local pickup only (no shipping).

Payment methods accepted                            ⟵ 118
• Personal check
Learn about payment Seller assumes all responsibility for listing this item..   ⟵ 120

Copyright © 1995-2004 eBay Inc. All Rights Reserved.
Designated trademarks and brands are the property of their respective owners.
Use of this Web site constitutes acceptance of the eBay User Agreement and Privacy Policy.

Fig. 4B

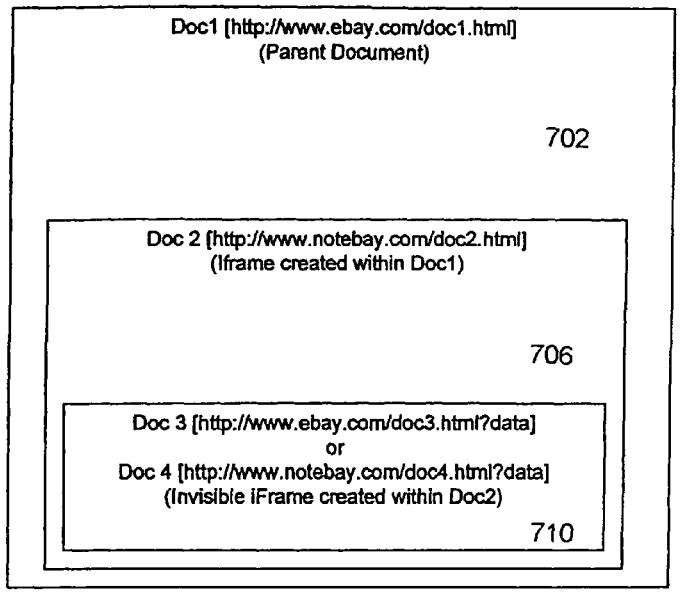
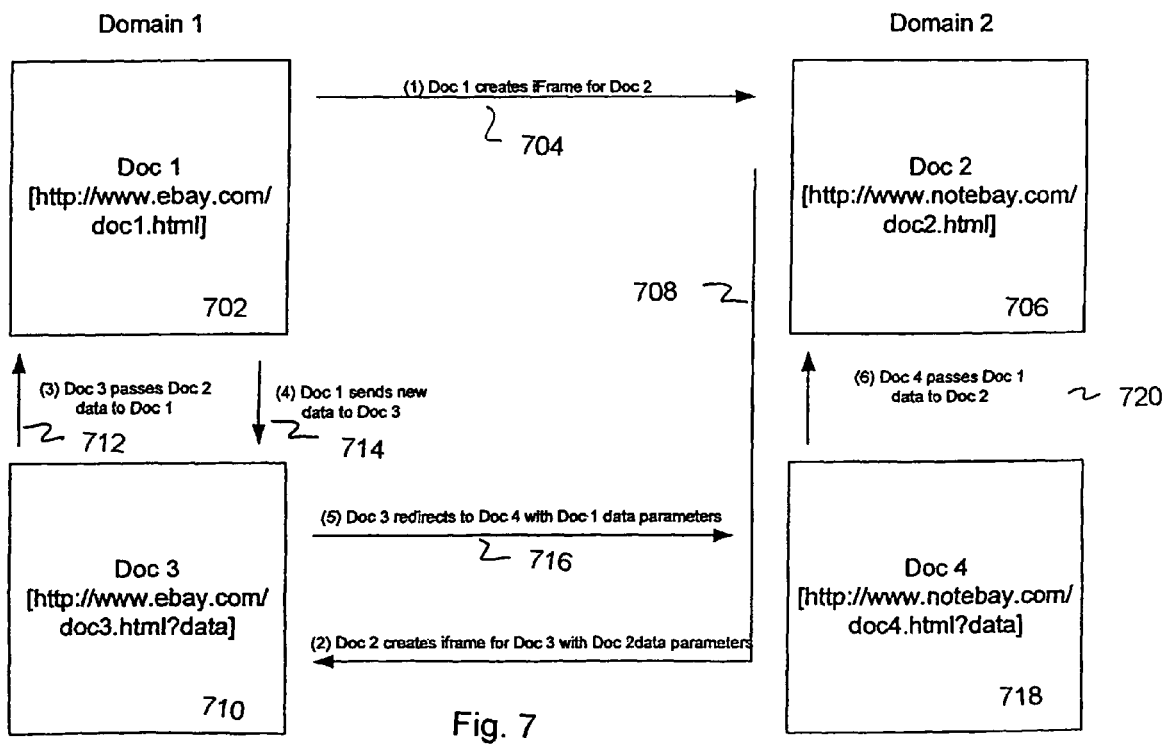
FIGURE 8
Fig. 7

METHOD AND APPARATUS FOR SECURELY DISPLAYING AND COMMUNICATING TRUSTED AND UNTRUSTED INTERNET CONTENT

FIELD OF THE INVENTION

This invention relates to securely displaying and communicating trusted and untrusted internet content via a web browser. The present invention further relates to communicating predetermined information between multiple documents opened in multiple web browser windows, where the documents are served from multiple domains.

BACKGROUND OF THE INVENTION

Electronic marketplaces, such as the person-to-person trading system pioneered by eBay, Inc., have become a well-known way to buy and sell goods and services via the Internet. Typical electronic marketplace systems allow sellers to enter a description of the item or service they wish to offer through an online auction. This item description may be in text or HTML format and is then stored on the electronic marketplace system. When a prospective buyer wishes to view the item (or service) that is being offered, he directs his web browser to download and display the appropriate item listing web page from the electronic marketplace system.

The item listing web page typically is an HTML document that includes not only the seller's item description but also other content provided by the electronic marketplace service. FIG. 1 shows an example of such a web page. In addition to the item description 114, the item listing document may include, e.g., an item title 100 ("Sample Item for Sale"), a minimum starting bid 102, the time remaining before the auction ends 104, the auction start time 106, the bid history 108, the item location 110, the shipping summary 112, detailed instructions concerning shipping and handling 116, payment methods accepted 118, legal disclaimers 120, an item number 122, and seller information 124 such as the seller's feedback rating.

As noted above, the item listing web page is normally an HTML document that includes not only content provided by the electronic marketplace service, but also the seller-provided item description, which may itself contain executable code, e.g., HTML code. For example, the item description 114 on FIG. 1 ("*Sample HTML item description*") was produced by the following HTML code:

```
<br> * * *
<br> <b>Sample HTML item description</b>
<br> * * *
```

Thus, the web browser on the potential buyer's computer "renders" both the service-provided HTML content and the seller-provided HTML content.

There is, however, an undesirable byproduct of permitting sellers to describe their items or services using embedded code. For example, a malicious seller might include HTML code that makes use of malicious HTML tags or scripts to alter the content provided by the auction service. For example, a malicious seller might attempt to replace a particular logo with a different image or try to divert private information that a potential buyer might provide to the auction service (e.g., cookie information).

These risks associated with embedded code have been widely recognized among web site providers. For example, the Department of Energy's Computer Incident Advisory Capability has reported that "[m]ost web browsers have the capability to interpret scripts embedded in web pages downloaded from a web server. Such scripts may be written in a variety of scripting languages and are run by the client's browser . . . . In addition to scripting tags, other HTML tags . . . have the potential to be abused by an attacker . . . to alter the appearance of the page, insert unwanted or offensive images or sounds, or otherwise interfere with the intended appearance and behaviour of the page." CIAC Information Bulletin K-021.

An approach that is conventionally used to address the risks associated with embedded content is to filter out potentially malicious code from within the embedded content. For example, a filter program might search the embedded code for <script> </script> HTML tags and delete any code that lies between the tags. A difficulty with this approach, however, is that a filter program may still fail to eliminate all of the potentially dangerous characters in the embedded code. Alternatively, the filter program may filter out too much material. In the above example, the filter program would prevent any and all scripts whatsoever from executing, including scripts that may be desirable or beneficial.

Thus, a long-felt need exists for a way to display both trusted content (e.g., the auction-service HTML content) and untrusted content (e.g., the seller-provided HTML content), while at the same time preventing the untrusted content from modifying or manipulating the trusted content.

SUMMARY OF THE INVENTION

The present invention solves this problem of embedded code by separating trusted and untrusted content on a web page served from a web server system to a web browser on a client computer. In accordance with the invention, the trusted and untrusted content is stored on separate network domains in the web server system. When the user requests the web page via a web browser, the user's web browser is instructed to display the trusted content in one browser window, and the untrusted content in a second browser view. As long as the web browser supports a cross-frame security feature, the web browser then prevents the trusted and untrusted content from substantially interacting.

Thus, the present invention provides a method for separating content on a web server system comprising the steps of receiving a first set of content from a first source; storing the first set of content on a first domain of the web server system; receiving a second set of content from a second source; and storing the second set of content on a second domain of the web server system; such that if the first and second sets of content were transmitted to a web browser supporting a cross-frame security feature and displayed in two separate browser views, the web browser would prevent the first and second sets of content from substantially interacting.

The present invention further provides a method for securely communicating content to a user's web browser from a web server system including at least two domains, comprising the steps of: receiving, from a first browser view of the web browser, a request to view a web page including trusted and untrusted content, wherein the web browser supports a cross-frame security feature; transmitting, from the first domain of the web server system, a first document including the trusted content, responsive to the request, to the web browser; transmitting, from the second domain of the web server system, a second document including the untrusted content, further responsive to the request, to the web browser; and instructing the web browser to display the first document in a first browser view and the second document in a second browser view; such the web browser prevents the first and second documents from substantially interacting.

In certain circumstances, it is desirable, however, to allow the first and second documents to exchange certain predetermined information, such as a document title or window size. To that end, the present invention further provides a method for securely displaying and exchanging information between first and second documents served from a first and a second domain, respectively, comprising the steps of: receiving, in a first browser view of a web browser supporting a cross-frame security feature, the first document from the first domain; receiving, in a second browser view, the second document from the second domain, wherein the second document includes predetermined information that is to be passed to the first document; creating a first URL that includes the information from the second document that is to be passed to the first document; and sending the first URL to the first domain via a third browser view. The method may further include the steps of receiving, in one of the first and third browser views, data from the first domain that is responsive to the information included in the first URL. The method may still further include creating a second URL including information to be passed to the second document; and sending the second URL to the second domain. In this way, predetermined data may be passed to and/or from the first and/or second documents on the web browser.

The invention further provides a method of securely communicating data between first and second documents served from a first and second domain, respectively, comprising the steps of: transmitting a first document from the first domain to a first browser view in a web browser supporting a cross-frame security feature, wherein the first document includes an instruction to the web browser to obtain, via a second browser view, a second document from a second domain; receiving, from a third browser view of the web browser, a URL including information derived from the second document; and parsing the URL to extract the information derived from the second document. Preferably, the invention further includes transmitting, based on the information extracted from the URL, additional content from the first domain to the web browser. This additional content may further include an instruction to the web browser (a) to create a second URL containing predetermined information from the first domain and (b) to send the second URL to the second domain.

Apparatuses and computer program products for carrying out the present invention are also provided.

BRIEF DESCRIPTION OF THE DRAWINGS

FIG. 1 is a pictorial of a prior art web page in an online person-to-person auction.

FIGS. 4A and 4B are pictorials of a web page for inputting an item description in accordance with the invention.

FIG. 7 is a block diagram and flow chart depicting communication between two documents in accordance with the invention.

FIG. 8 is a HTML-based page representation depicting multiple browser views capable of exchanging information in accordance with the invention.

DETAILED DESCRIPTION OF THE INVENTION

In the following presentation, for the purposes of explanation, numerous specific details are set forth in order to provide a thorough understanding of the present invention. It will be apparent, however, to one of ordinary skill in the art that the present invention may be practiced without some of these specific details. In other instances, well-known structures and devices are shown in block diagram form.

Figure 2:
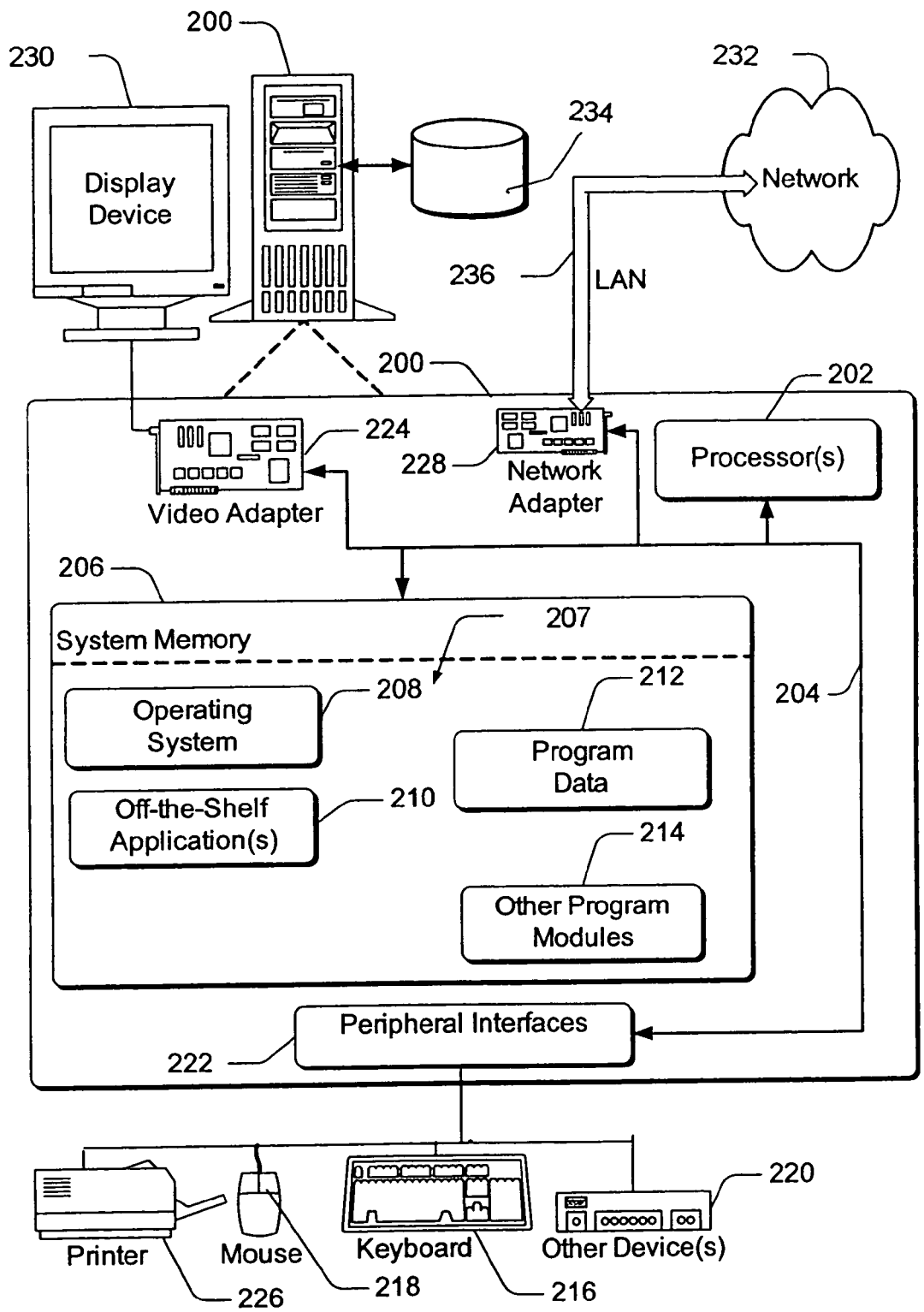
FIG. 2 is a block diagram of an exemplary computer system upon which the present invention may be implemented.

As stated above, the present invention provides a method and apparatus for securely communicating and exchanging trusted and untrusted content between a web server system and a client computer. FIG. 2 is a block diagram showing an example computer 200 within which various functionalities described herein can be fully or partially implemented. Computer 200 can function as a server in a web server system, a personal computer, a mainframe, or various other types of computing devices. It is noted that computer 200 is only one example of computer environment and is not intended to suggest any limitation as the scope or use or functionality of the computer and network architectures. Neither should the example computer be interpreted as having any dependency or requirement relating to any one or combination of components illustrated in FIG. 2.

Computer 200 may include one or more processors 202 coupled to a bus 204. Bus 204 represents one or more of any variety of bus structures and architectures and may also include one or more point-to-point connections.

Computer 200 may also include or have access to memory 206, which represents a variety of computer readable media. Such media can be any available media that is accessible by processor(s) 202 and includes both volatile and non-volatile media, removable and non-removable media. For instance, memory 206 may include computer readable media in the form of volatile memory, such as random access memory (RAM) and/or non-volatile memory in the form of read only memory (ROM). In terms of removable/non-removable storage media or memory media, memory 206 may include a hard disk, a magnetic disk, a floppy disk, an optical disk drive, CD-ROM, flash memory, etc.

Any number of program modules 207 can be stored in memory 206, including by way of example, an operating system 208, off-the-shelf applications 210 (such as e-mail programs, web browsers, web server applications, etc.), program data 212, and other modules 214. Memory 206 may also include one or more databases 114 containing data and information enabling functionality associated with program modules 112.

A user can enter commands and information into computer 200 via input devices such as a keyboard 216 and a pointing device 218 (e.g., a "mouse"). Other device(s) 220 (not shown specifically) may include a microphone, joystick, game pad, serial port, etc. These and other input devices are connected to bus 204 via peripheral interfaces 222, such as a parallel port, game port, universal serial bus (USB), etc.

A display device 222 can also be connected to computer 200 via an interface, such as video adapter 224. In addition to display device 222, other output peripheral devices can include components such as speakers (not shown), or a printer 226.

Computer 200 can operate in a networked environment or point-to-point environment, using logical connections to one or more remote computers. The remote computers may be personal computers, servers, routers, or peer devices. A network interface adapter 228 may provide access to network 232 such as when a network is implemented as a local area network (LAN), or wide area network (WAN), etc.

In a network environment, some or all of the program modules 207 executed by computer 200 may be retrieved from another computing device coupled to the network. For purposes of illustration, the operating system 208 and off-the-shelf application(s) 210, for example, are illustrated herein as discrete blocks, although it is recognized that such programs and components reside at various times in different storage components remote or local, and are executed by processor(s) 202 of computer 200 or remote computers.

Figure 3:
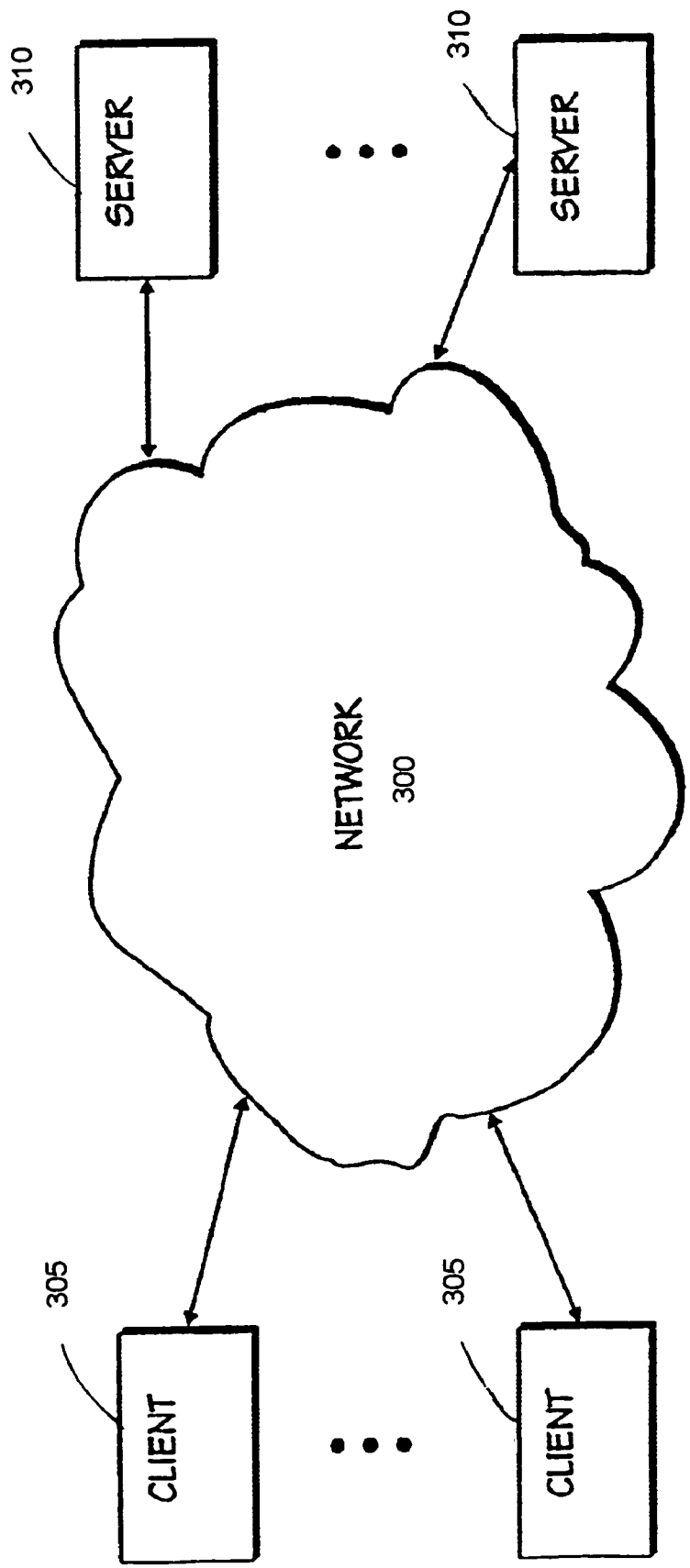
FIG. 3 is a block diagram depicting a simplified client-server environment in which online communication may take place.

FIG. 3 illustrates the various ways in which the computer described in FIG. 2 may be utilized: namely, as a client computer or as a server in a client-server environment such as the World Wide Web (the Web). The terms "client" and "server" are used to refer to a computer's general role as a requestor of data (the client) or provider of data (the server). Web clients 305 and Web servers 310 communicate using a protocol such as the HyperText Transfer Protocol (HTTP). In the Web environment, web browsers reside on clients and render Web documents (pages) served by the Web servers. The client-server model is used to communicate information between clients 305 and servers 310. Web servers 310 are coupled to the Internet 300 and respond to document requests and/or other queries from web clients 305. When a user selects a document by submitting its Uniform Resource Locator (URL), a web browser, such as Netscape Navigator or Internet Explorer, opens a connection to a server 310 and initiates a request (e.g., an HTTP GET) for the document. The server 310 delivers the requested document, typically in the form of a text document in a standard markup language such as HyperText Markup Language (HTML).

The HTML document may contain text, graphics, audio clips, and video clips, as well as metadata or commands providing formatting information. It also may include embedded "links" that reference other data or documents located on the web clients 305 or servers 315. In addition, HTML documents may contain embedded software components containing program code that perform a wide variety of operations, such as manipulating data and playing audio or video clips. Example software components include ActiveX, Java, JavaScript and VBScript components. The web browser on client 305 executes each script and/or software component as it reaches the position in the script during interpretation of the HTML document.

As described above, conventional electronic marketplace services include an item description (as embedded HTML) in a web page listing an item or service for sale ("item listing page"). This item description may include malicious software components that attempt to alter the content provided by the service (e.g., logos, links, cookies, etc.). The present invention solves this problem by separating "trusted" item listing information (e.g., a header or description that is created by the electronic marketplace service) from "untrusted" item description information supplied by a seller who may have bad intent.

Figure 4A:
Figure 4B:
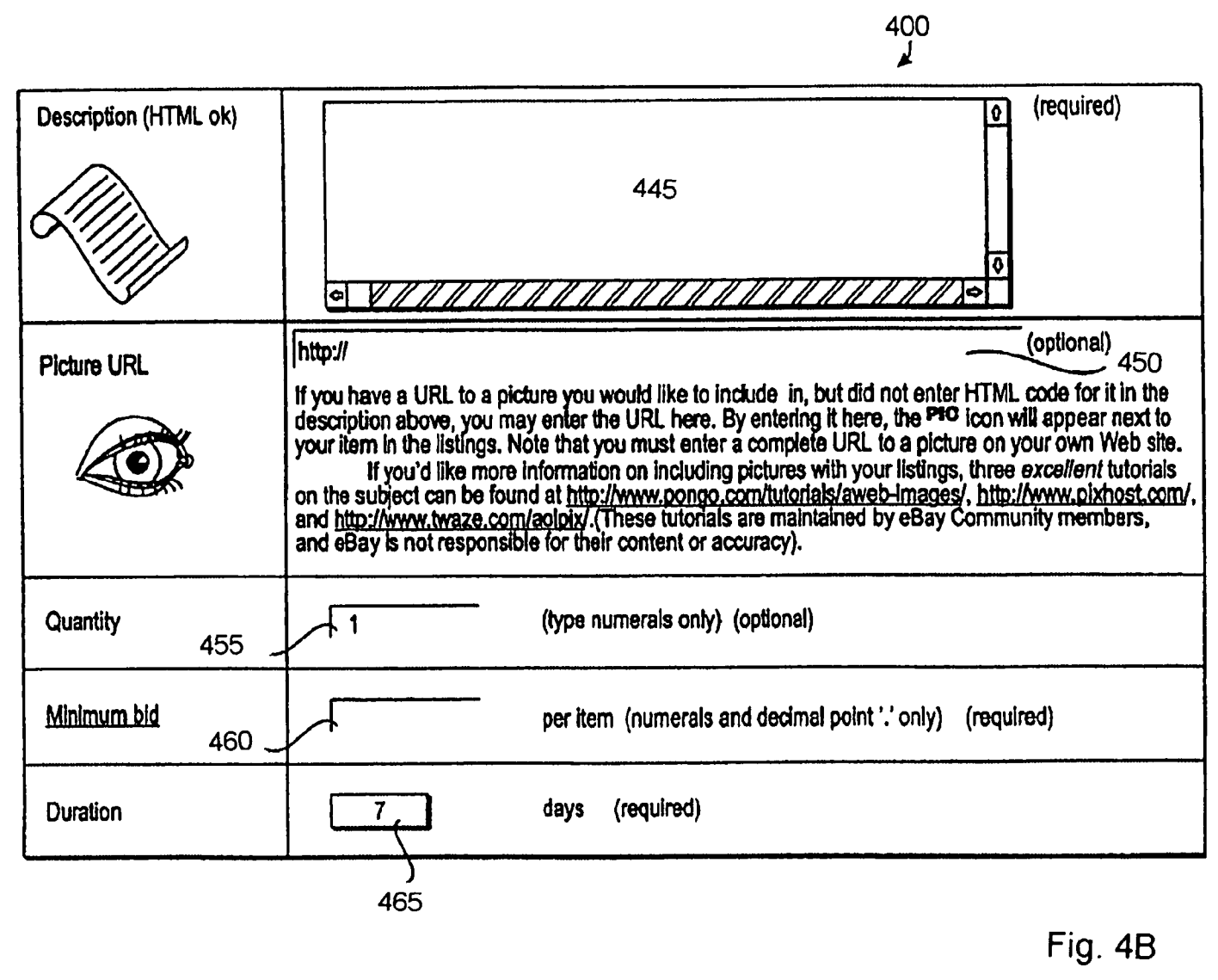

In one embodiment of the invention, the separation of trusted content from untrusted content may take place upon receiving an item description from a seller. By way of example, FIGS. 4A and 4B show an item input screen 400, at which a seller may input information concerning an item he wishes to offer for sale. The seller is prompted to enter information such as his User ID 405, password 410, the title of the item for sale 415, the item location 420, the category of the item 425, accepted payment methods 430, shipping terms 440, the item description in HTML format 445, the location that a picture may be found 450, the quantity available 455, the minimum bid 460, and duration of the listing 465.

In accordance with the invention, certain seller-entered information may be deemed "trusted" while other information may be deemed "untrusted." For example, some fields on the item listing screen 400 require the seller to pick from predetermined "safe" options. At the Accepted Payment Methods 430 field, for example, the seller is required to check a box next to one of the following limited options: Money Order/Cashier's Check; COD; See Item Descrption, Personal Check; On-line Escrow; Other; Visa/Mastercard; American Express; and Discover. Because the options are predetermined, there is no opportunity for an ill-intentioned seller to include malicious code in his response. Thus, such information may be deemed "trusted." By comparison, other seller-provided information may be deemed "untrusted." Untrusted content is content that has the potential to include malicious code. For example, the Item Description field 445 may be in HTML format, which may include malicious code such as scripts or tags, as described above.

Figure 5:
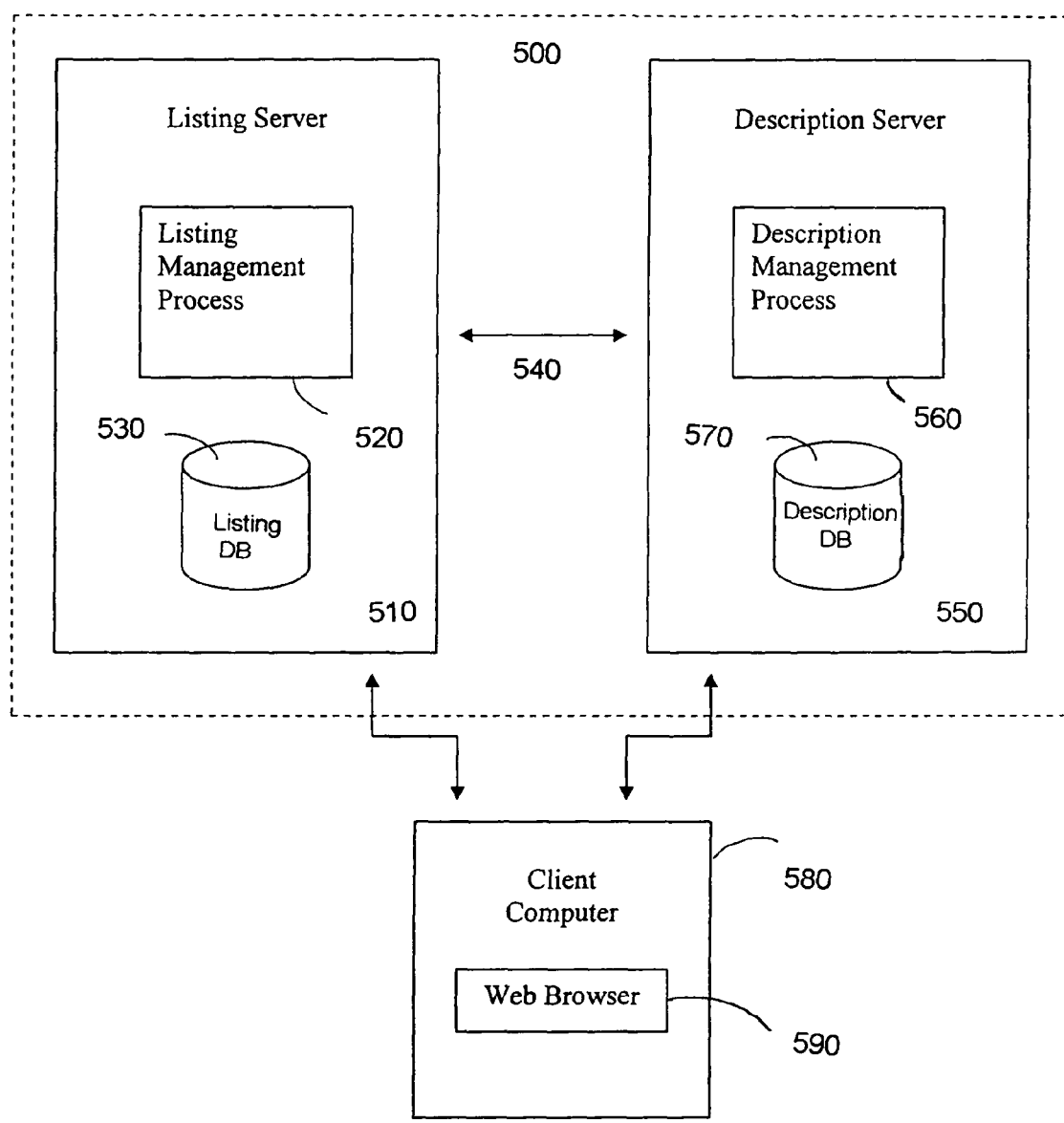
FIG. 5 is a block diagram of a web server system in accordance with the invention.

In a preferred embodiment of the invention, the trusted content and the untrusted content relating to an item listing are stored on a web server system including two separate servers. FIG. 5 depicts an example of such a system. Server system 500 preferably includes a listing server 510 and a description server 550, each in communication with the other via communication link 540. Each includes a management process 520, 560 and a database 530, 570. Listing server 510 and description server 550 are further in communication with a web browser 590 in client computer 580 via a communication medium such as the World Wide Web.

In operation, in this preferred embodiment, the listing management process 520 in listing server 510 interacts with a seller using a client computer 580, e.g., by "serving" the item input screen described above with reference to FIGS. 4A and 4B. Listing management process 520 then receives the seller's item information and distinguishes between trusted and untrusted content in a predetermined fashion such as that described above, e.g., by field. In accordance with the invention, trusted content is stored in the listing database 530, while untrusted content is passed via communication link 540 to the description management process 560 in description server 550. Description management process 560 then stores the untrusted content in the description database 550.

In further accordance with the invention, when a potential buyer seeks to view an item listing via web browser 590 on client computer 580, web browser 590 sends a request to listing server 510 for the corresponding item description screen. Listing management process 520 on server 510 receives the request, retrieves appropriate "trusted" information from listing database 530 and provides this information to the web browser in the form of an HTML document. Web browser 590 renders this document in the ordinary manner in the primary view of the web browser. The primary view of a web browser, as used here, is the view that generates the initial request for the web page encompassing both trusted and untrusted content. For the purpose of the invention, a browser view may include, e.g., a window, a subwindow, a dialog box, a frameset, a frame, and an inline floating frame.

In accordance with the invention, one of the lines in the "trusted" document is an HTML instruction to the web browser 590 to create a secondary browser view. The secondary browser view is then directed to load some or all of the untrusted content from description server 550 and to display it in the secondary browser view. For example, the secondary browser view may be created by the HTML tags <IFRAME NAME="DescriptionView510" SRC=http://DescriptionServerAddress/DescriptionPath/ItemDescription.HTM></IFRAME>.

Figure 6:
FIG. 6 is a pictorial of a web page in an online person-to-person auction in accordance with the invention.

If the untrusted content is in HTML format, it will then "render" within the secondary browser view, in a similar manner to the manner in which such content is rendered on conventional pages that included it as embedded content. FIG. 6 depicts an exemplary web page, wherein the primary browser view is shown as view 600 and the secondary browser view is shown as view 610. In this example, item description 114 (provided by the seller) is deemed "untrusted" and is accordingly displayed on web browser 590 within a second view 610 of the web browser. Advantageously, the viewable length of item description 114 is now constrained by the size of secondary browser view 610. If item description 114 is "longer" than the view size, scroll bar 520 can be used to navigate within it.

In accordance with the present invention, web browser 590 preferably supports a cross-frame security feature. This feature is a security restriction that has been implemented in certain recent web browser programs, including, e.g., versions 4.0 and later of Microsoft Corporation's Internet Explorer®, as well as other browser programs. This restriction relates to the interaction of Web pages that are joined together to form HTML framesets. An HTML frameset consists of a collection of frames that allow creation of multiple document windows within one browser. Each frame appears to act like a separate browser window, displaying multiple information sources simultaneously. Within each frame, a user can scroll up and down, and perform all the things that a user would normally do within a single browser window. The links in a frame can control what is displayed in other frames or windows.

In Internet Explorer®, for example, pages of an HTML frameset may only interact if the domain components of the URL addresses refer to the same top-level or second-level domain. If the HTML pages in two frames have different domain names, however, the web browser prevents them from substantially interacting. For example, Internet Explorer® prevents any attempt to read out or modify content between frames served from different domains, but allows access required to instruct a frame or subframe to navigate to a particular URL address that is beyond the domain restriction. Any attempt by a document that attempts to access parts of another document in violation of the cross-frame security feature of the browser is automatically blocked by a "permission denied" error.

In further accord with the present invention, the domain names of the listing server and the description server are different, so that content from each server is blocked by the browser security feature from substantially interfering with content in the other. The preferred relationship between the domain names will, of course, depend on the cross-frame security feature of the web browser(s) for which the system is designed. For example, under the cross-frame security feature of Microsoft Internet Explorer®, as long as two servers (e.g., listing server 520 and description server 550) do not share top-level or second-level domain names, the content served from those servers will be prevented from substantially interacting (assuming that the content from each server is served via a separate web view of the receiving web browser).

Accordingly, the present invention contemplates two servers having different domain addresses. For example, listing server 520 may be assigned the domain name "ebay.com," while description server 550 may be assigned the domain name "not-ebay.com."

In an alternative embodiment, a single server may be provided with two domain addresses. In this embodiment, the trusted and untrusted content could be stored on a single server, and perhaps even in a single database, but still be "served" from two separate logical domains.

There has thus been described an electronic marketplace system in which auction-related content may be displayed in one window of a customer's web browser while item-related content is displayed in a second window of the customer's web browser, such that the auction-related content and the item-related content are prevented from substantially interacting.

In certain circumstances, it may be desirable, however, to allow two documents served from two different domains to two frames of a web browser to exchange certain predetermined information. For example, in the online auction listing described in FIG. 6, it may be desirable to make the size of the item description view 610 either larger or smaller, depending on the amount of the description content provided by the seller to be displayed in the description view 610. Because the item listing page contains two views 600, 610, and because the content displayed in each view is served from two different domains, a web browser supporting a cross-domain security feature will prevent the two views from exchanging such information, as described above.

Accordingly, the present invention further provides a method to exchange certain predetermined information between two documents in two browser views served from different domains. This aspect of the invention makes use of the full access privileges that are allowed between frames that serve documents from the same top-level or second-level domain, and the limited access privileges that are permitted even between frames serving documents from different domains. More specifically, Internet Explorer® permits a first document in one frame to freely script content into and out of a second document in another frame, where the first and second documents are served from the same domain. Internet Explorer further permits a first document in one frame to direct another frame to navigate to and render a second document, even where the two documents are served from different domains, if the instruction is passed as a URL. Embodiments of the present invention contemplate using a third frame to mediate between two documents by passing information from a document served from a first domain to a second document served from a second domain, without interfering with the simultaneous display of the two documents on a web browser.

FIGS. 7 and 8 depict a method of passing data between two documents served in two frames from two different domains in accordance with the invention. The method starts at a first browser view 702 that receives a first document Doc1 from a first domain, Domain1, at an Internet address http://www.ebay.com/doc1.html. By way of example, document Doc1 may be an item description screen as shown in FIG. 5. Preferably, document Doc1 is an HTML document that includes an instruction to the web browser to create a new browser view and to display item description information in the view (view 610 in FIG. 6; view 706 in FIG. 8). This may be accomplished via an HTML IFRAME statement (step 704 on FIG. 7), which passes to the new IFRAME a URL address at which a second document Doc2 containing the item description may be obtained (e.g., http://www.not-ebay.com/doc2.html). Step 704 thus results in the creation of a new inline floating frame ("Iframe") 706 and the rendering of document Doc2 in view 706. (Because documents Doc1 and Doc2 are served from domains "ebay.com" and "not-ebay.com," respectively, at this point they are prevented by the browser's cross-domain security feature from directly exchanging information.)

In further accordance with the invention, document Doc2 contains certain predetermined information to be passed back to document Doc1 (e.g., the preferred size of the IFRAME containing document Doc2). The predetermined information may include information that is either contained within document Doc2 (e.g., a variable definition such as "PreferredSize=3 lines") or information that may be derived from document Doc2 as the web browser renders document Doc2 in view 706. Document Doc2 further includes an instruction to the web browser to create (at step 708) yet another inline floating frame (view 710). The instruction of step 708 preferably includes a URL reference that directs view 710 to navigate to and render a third HTML document, Doc3, located on domain Domain1 at http://www.ebay.com/doc3.html.

In accordance with the invention, the instruction of step 708 also includes the information to be passed to document Doc 1. This information may be appended to the URL reference as a conventional "query string." Thus, the URL reference would be of the form http://www.ebay.com/
  doc3.html?data1tobepassed=data1value&data2tobepassed=data2value
 ....

For example, if the information to be passed from document Doc2 to document Doc1 is the preferred frame size for document Doc2, the URL reference would be http://www.ebay.com/doc3.html?size=PreferredSize.

In accordance with the instruction from document Doc2 in view 706, the web browser via view 710 sends the URL request to domain 1 for document Doc3. Notably, at this point, the query-string data from document Doc2 has now been transmitted to the server at domain Domain1.

Preferably, however, the server at domain Domain1 returns a document Doc3 to view 710 that is then rendered. The returned document Doc3 preferably includes the query-string data and also a simple script-based parser such as those ordinarily employed in web page development. The parser in document Doc3 extracts from the URL query string the data that is to be passed to document Doc1.

At this point, document Doc3 (a document served from domain Domain1) possesses information originating from document Doc2 (a document served from domain Domain2) that is to be passed to document Doc1 (also served from domain Domain1). Because the web browser's cross-domain security feature permits free access between documents on the same domain, in step 712 document Doc1 is able to access and send the information directly to document Doc1, using document objects made available by document Doc1 in accordance with the well-known Document Object Model of Dynamic HTML. Document Doc1 may then act on that information, e.g., by dynamically adjusting the size of view 706.

Should there be responsive information from document Doc1 to be sent to document Doc2, a similar procedure is followed, either (1) by causing view 710 to be directed to a fourth document Doc4 served from domain Domain2 or (2) by creating a fourth browser view 718.

If the former approach is used, at step 714 document Doc1 sends the responsive information to document Doc3 in view 710, either as an URL reference having a query string or by directly accessing the document objects made available by document Doc3 and thereby causing document Doc3 to construct a URL reference having the information to be sent to document Doc2 attached in a query string. At step 716, the URL reference causes view 710 to request and render document Doc4 from domain Domain2 at location http://www.not-ebay.com/doc4.html?datatobepassed, using the query string information from document Doc1. Document Doc4 in turn is obtained from the address specified, and, when rendered by view 710, includes instructions to the web browser to parse the query string data from document Doc1 and (at step 720) pass it to document Doc2 using the document objects made available by document Doc2.

If the latter approach is used, alternatively, the responsive information from document Doc1 is passed to document Doc2 via a new web browser view 718. The new browser view 718 may be created by either of documents Doc1 or Doc3 by an IFRAME instruction that includes a URL reference having a query string containing the data from document Doc1 to be passed to document Doc2. Regardless of which document (Doc1 or Doc3) creates the new view 718, document Doc4 on domain Domain2 ultimately is requested and obtained from the URL address specified, and, when rendered by view 718, includes instructions to the web browser to parse the query string data from document Doc1 and pass it to document Doc2 using the document objects made available by document Doc2.

In this way, there is provided a method for securely passing data between two documents served from two different domains and viewed on two separate views of a client web browser.

It will be appreciated that the parsing function described in the above method may be implemented on the server side, rather than at the client. In this alternative, a URL containing data to be passed would be parsed by the server hosting the domain receiving the URL (e.g., the parsing described above as occurring at document Doc3 itself could be performed by the server at domain Domain1). In this alternative embodiment, document Doc3 in view 710 could serve simply to pass the URL containing the data on to the server hosting domain Domain1, rather than itself performing the parsing.

It will further be recognized that document Doc4 may be similarly handled. It will be further appreciated that any of documents Doc1, Doc2, Doc3 and Doc4 may be dynamically-served documents that may be modified or updated by the server that hosts them, based on the data that is passed from document to document.

In a further embodiment, an HTML "form" may be used to pass data among the various documents and servers described above instead of a query string. For example, document Doc2 may create and populate a "form" data structure that could then be "posted" or sent to document Doc3 on the server hosting domain Domain1, with the associated results of the post operation being returned to view 710. An example of HTML code that may be used in document Doc2 to generate and post the form is as follows:

```
<iframe id="dataIFrame" name="dataIFrame"></iframe>
<form name="dataForm" method="post" target="dataIFrame"
    action="http://www.ebay.com/doc3.html">
<input type="hidden" name="data1" value="value">
<input type="hidden" name="data2" value="value">
</form>
<script language="javascript">
document.forms["dataForm"].submit( );
</script>
```

Note that the form "method" attribute may be either "get" or "post" in this embodiment.

The method for transmitting information between documents Doc1 and Doc2 in accordance with the present invention may also be described from the perspective of one of the web servers that host the documents. From the perspective of the server hosting document Doc1 on domain Domain1, for example, the first step is transmitting document Doc1 from the first domain to a first browser view 702 in the web browser, where document Doc1 includes an instruction to the web browser to obtain, via a second browser view 706, a second document Doc2 from a second domain. The server at domain Domain1 then receives, from a third browser view 710 of the web browser, a URL (or form data block) including information derived from the second document. The server may then parse the URL to extract the information derived from the second document. Next, the server transmits, based on the information extracted from the URL or form, additional content from the first domain to the web browser. The additional content may further include an instruction to the web browser (a) to create a second URL or form containing predetermined information from the first domain and (b) to send the second URL or form to the second domain.

It should be noted that the techniques and functionality provided by the present invention are described herein in the general context of computer-executable instructions, such as HTML "documents," executed or "rendered" by one or more computers (one or more processors) or other devices. It will be appreciated that although certain embodiments described above refer to embedded HTML code, the invention is not limited solely to an environment supporting HTML or document objects. Rather, the present invention is applicable in any environment in which malicious executable code is embedded in a document viewable by a browser on a computer.

In addition, computer-executable instructions generally include routines, programs, objects, components, data structures, logic, etc. that perform particular tasks or implement particular abstract data types. Typically, the functionality of the computer-executable instructions may be combined or distributed as desired in various embodiments. It is noted that a portion of a set of computer-executable instructions may reside on one or more computers operating on a system.

An implementation of these computer-executable instructions and techniques may be stored on or transmitted across some form of computer readable media. Computer readable media can be any available media that can be accessed by a computer. By way of example, and not limitation, computer readable media may comprise volatile and non-volatile media, or technology for storing computer readable instructions, data structures, program modules, or other data.

In the foregoing specification, the invention has been described with reference to specific embodiments. It will, however, be evident that various modifications and changes may be made thereto without departing from the broader spirit and scope of the invention.

We claim:

1. One or more non-transitory computer readable media having stored thereon a plurality of instructions that, when executed by one or more processors of a computing device, cause the one or more processors to perform operations comprising:

storing trusted content on a first server on a first domain;
   receiving untrusted content from a user of a web site and storing the untrusted content on a second server on a second domain;
   receiving at a web server system, from a web browser, a request to view for a first set of trusted content and a second set of untrusted content;
   generating, at the second domain, a reference to the first domain comprising information within a query string;
   transmitting, from the second domain to the web browser, a second document containing the second set of untrusted content and the reference to the first domain;
   receiving, at the first domain, the query string from a third browser view of the web browser;
   determining, by the web server system, a size of a second browser view based on the information within the query string; and
   generating, by the web server system, a single web page comprising the first set of trusted content and the second set of untrusted content wherein the generating of the single web page further comprises preventing the first set of trusted content and the second set of untrusted content from interacting by providing the first document in a first browser view and the second document in the second browser view.

2. The one or more non-transitory computer readable media as in claim 1, wherein the web browser supports a cross-frame security feature.

3. The one or more non-transitory computer readable media as in claim 1, wherein the single web page lists an item or service offered in an electronic marketplace service.

4. The one or more non-transitory computer readable media as in claim 1, wherein the trusted content is provided by an electronic marketplace service.

5. The one or more non-transitory computer readable media as in claim 1, wherein the trusted content is provided in a format other than HTML by the user.

6. The one or more non-transitory computer readable media as in claim 1, wherein the untrusted content is provided in HTML format by the user.

7. The one or more non-transitory computer readable media as in claim 6, wherein the untrusted content is a description of an item or service offered in an electronic marketplace service.

8. A method comprising:

storing trusted content on a first server on a first domain;
   receiving untrusted content from a user of a web site and storing the untrusted content on a second server on a second domain;
   receiving at a web server system, from a web browser, a request for a first set of trusted content and a second set of untrusted content;
   generating, at the second domain, a reference to the first domain comprising information within a query string;
   transmitting, from the second domain to the web browser, a second document containing the second set of untrusted content and the reference to the first domain;
   receiving, at the first domain, the query string from a third browser view of the web browser;
   determining by the web server system a size of a second browser view based on the information within the query string; and
   generating, by the web server system, a single web page comprising the first set of trusted content and the second set of untrusted content wherein the generating of the single web page further comprises preventing the first set of trusted content and the second set of untrusted content from interacting by providing the first document in a first browser view and the second document in the second browser view.

9. A system comprising:

a means for storing trusted content on a first server on a first domain;

a means for receiving untrusted content from a user of a web site and storing the untrusted content on a second server on a second domain;

a means for receiving at a web server system, from a web browser, a request for a first set of trusted content and a second set of untrusted content;

a means for generating, at the second domain, a reference to the first domain comprising information within a query string;

a means for transmitting, from the second domain to the web browser, a second document containing the second set of untrusted content and the reference to the first domain a means for receiving, at the first domain, the query string from a third browser view of the web browser;

a means for determining, at the web server system, a size of a second browser view based on the information within the query string; and a means for generating, at the web server system, a single web page comprising the first set of trusted content and the second set of untrusted content wherein the generating of the single web page further comprises preventing the first set of trusted content and the second set of untrusted content from interacting by providing the first document in a first browser view and the second document in the second browser view.

* * * * *